(No Model.) T. R. MORGAN, Sr. 17 Sheets—Sheet 3.
CRANE.
No. 290,260. Patented Dec. 18, 1883.
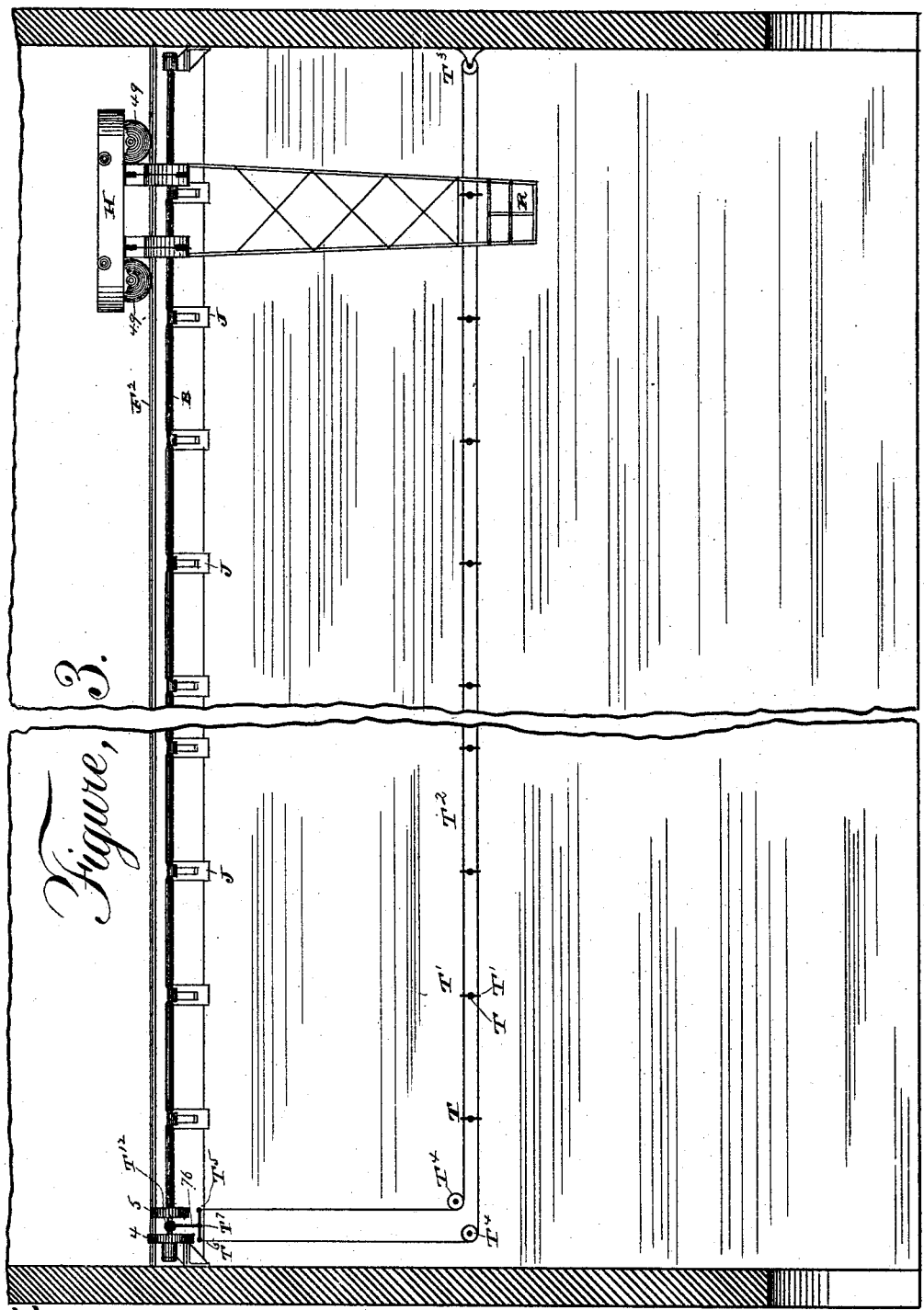

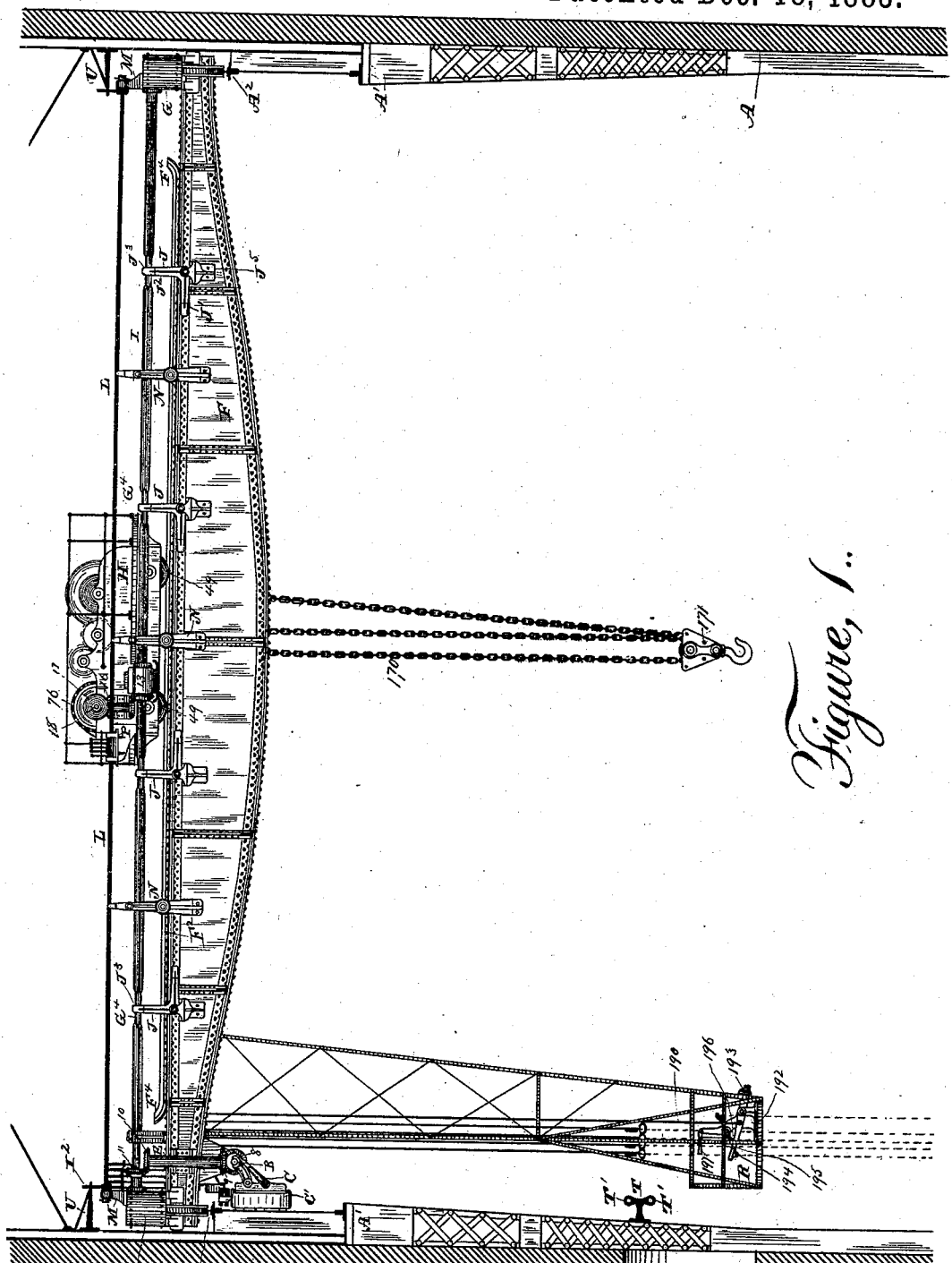

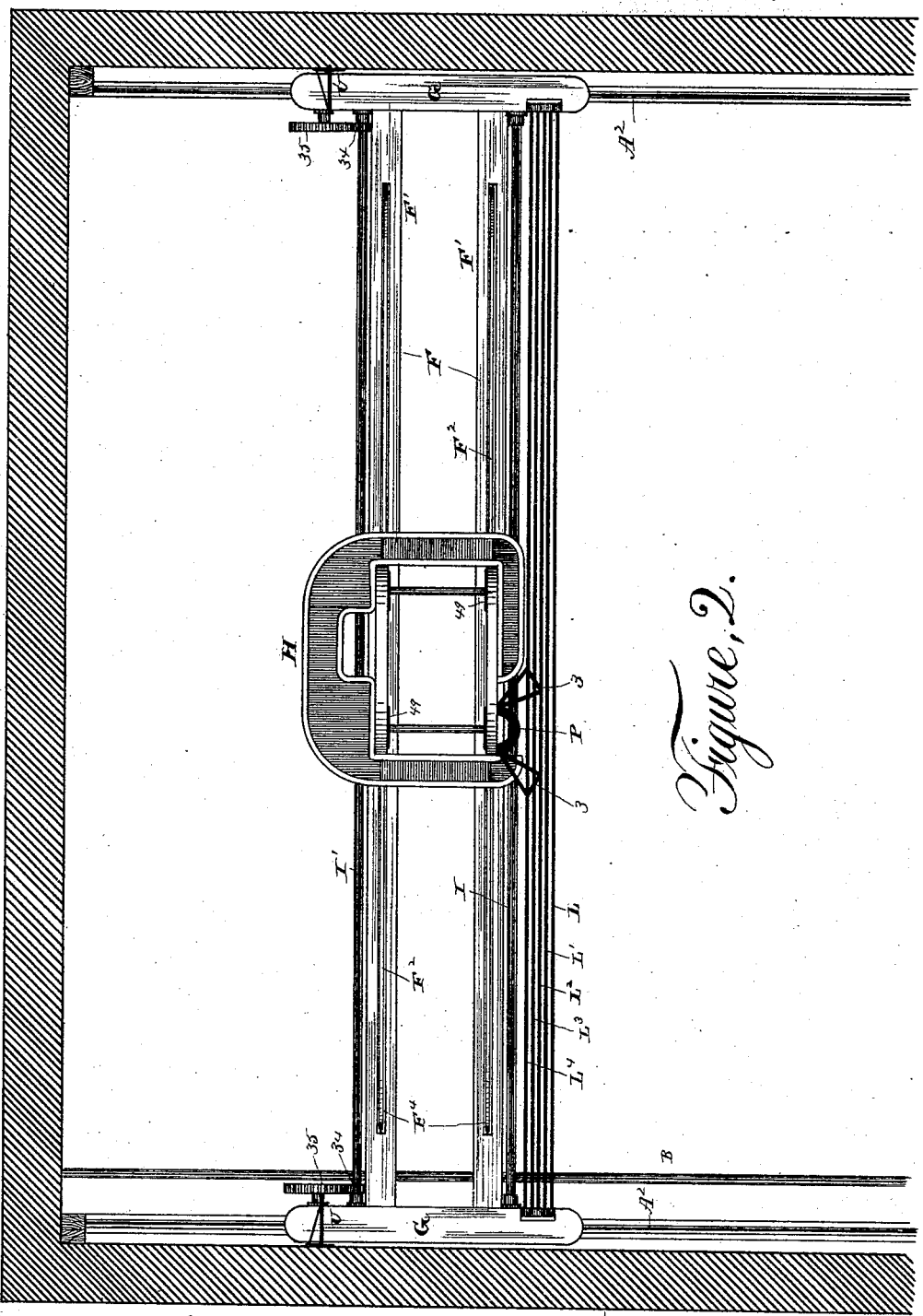

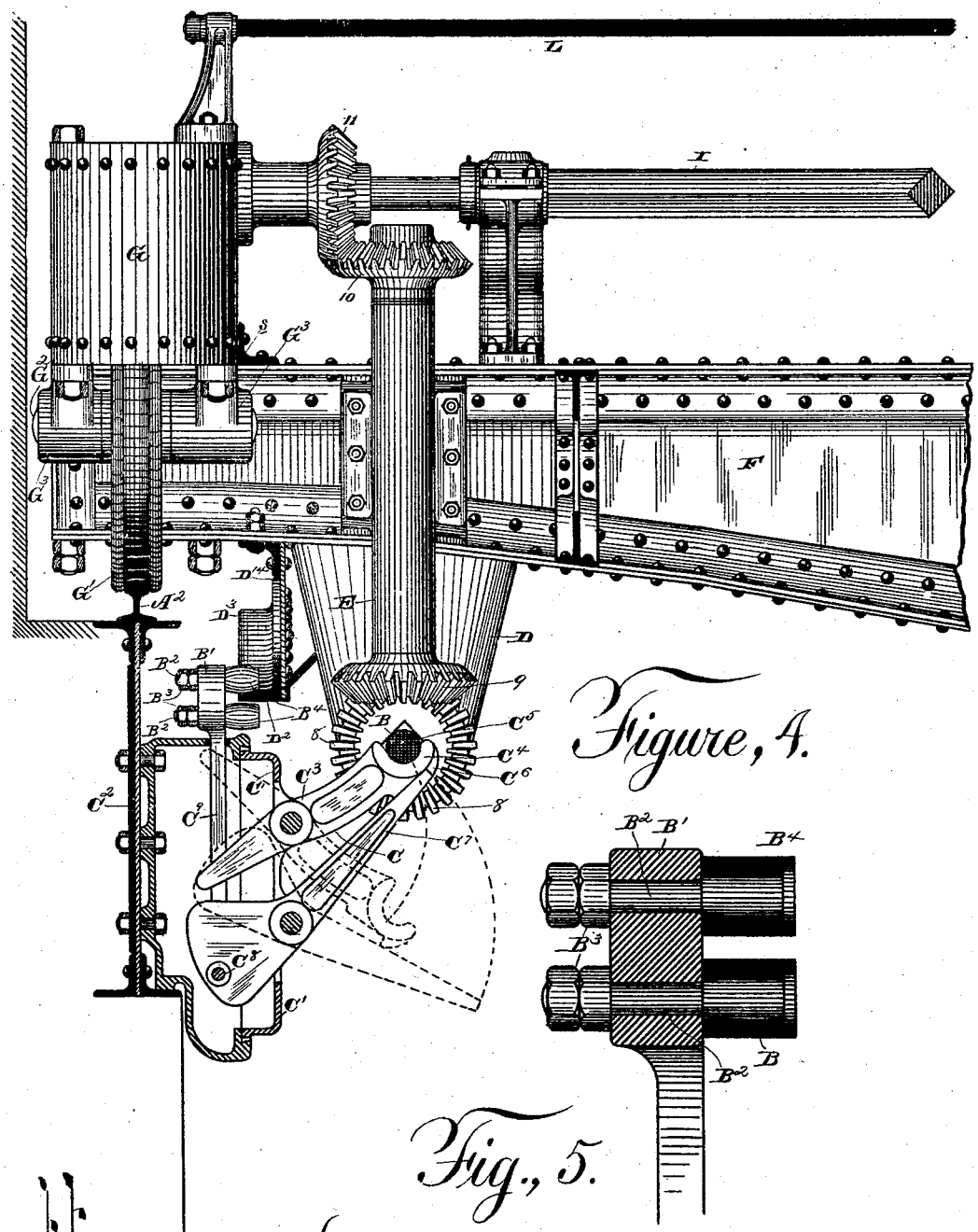

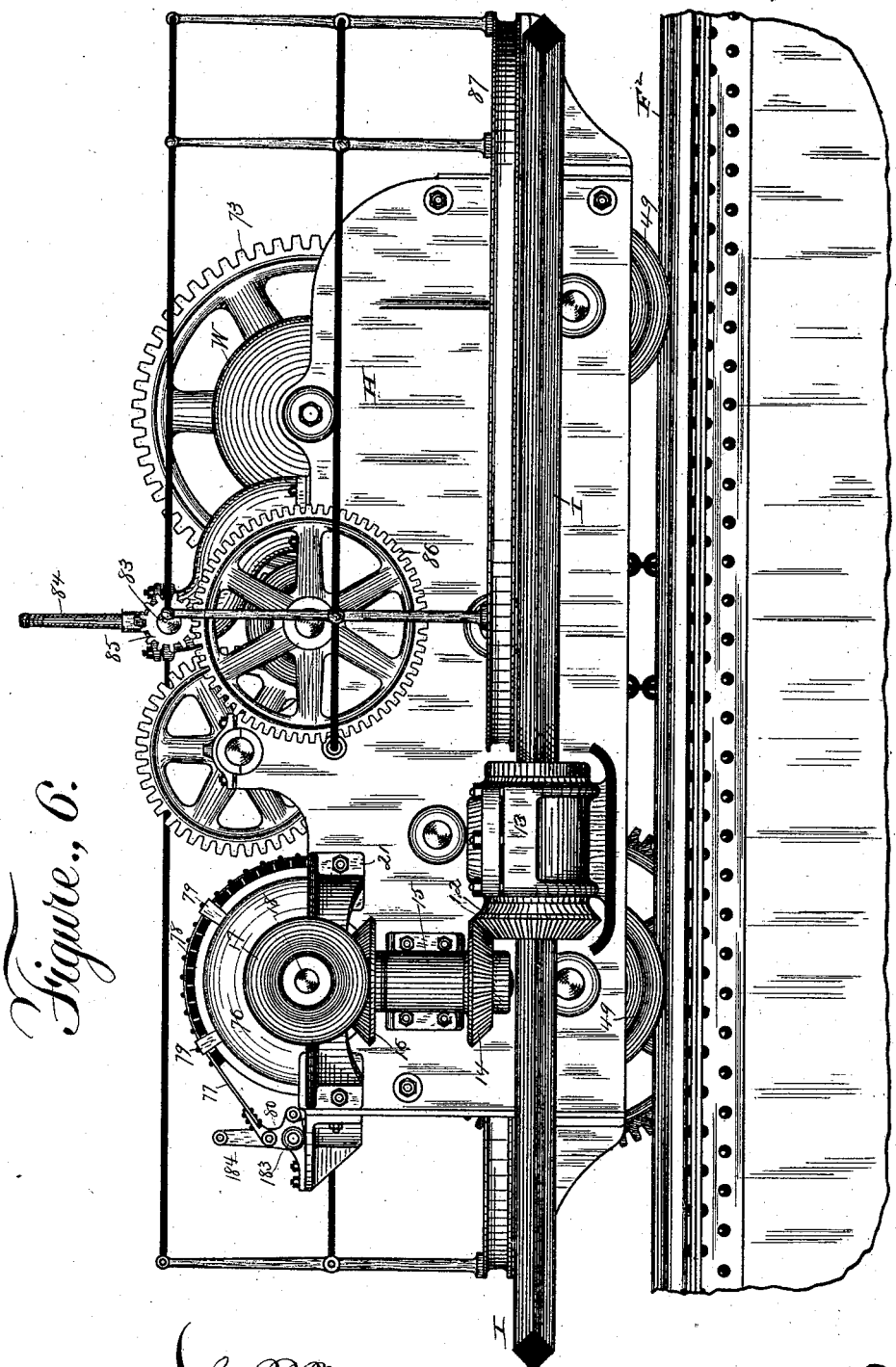

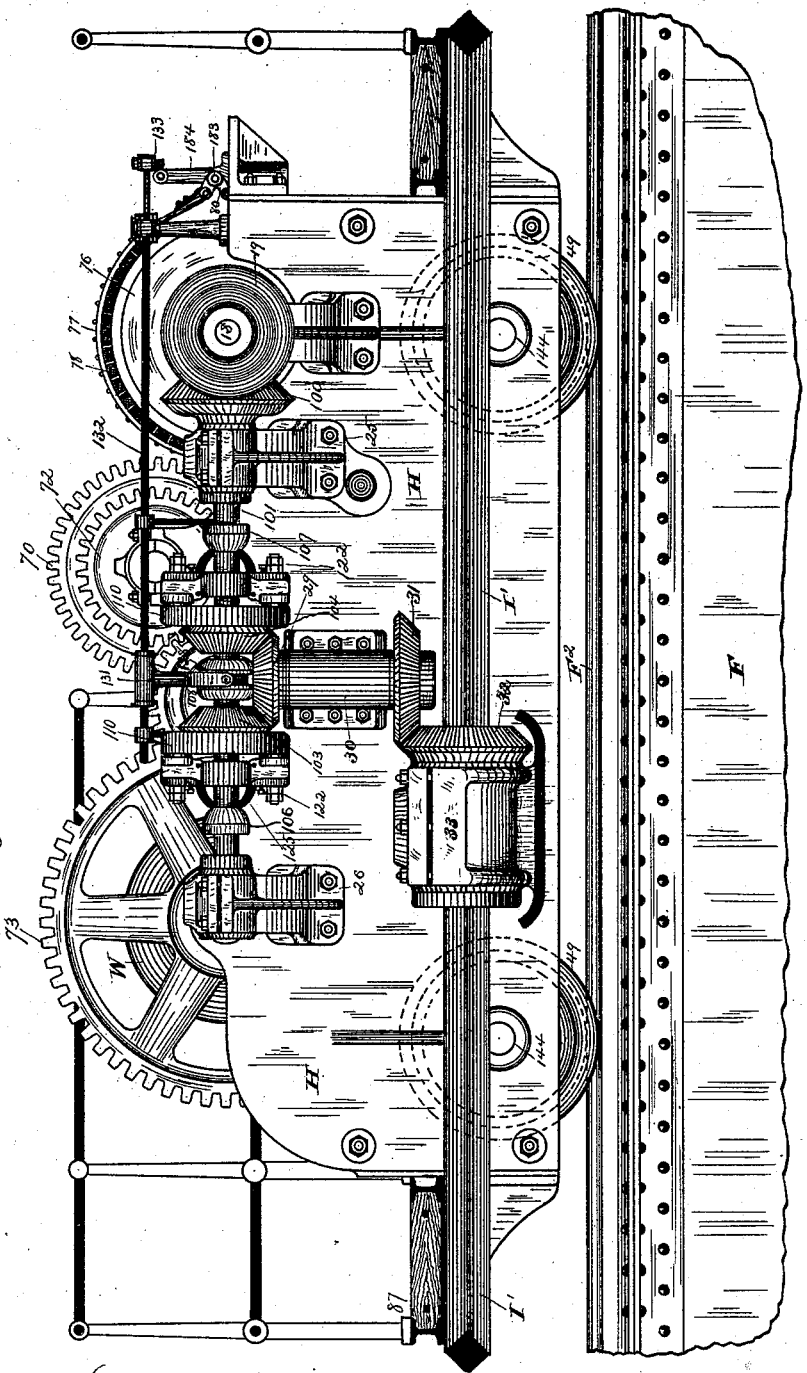

(No Model.)  
T. R. MORGAN, Sr.  
CRANE.  
No. 290,260. Patented Dec. 18, 1883.
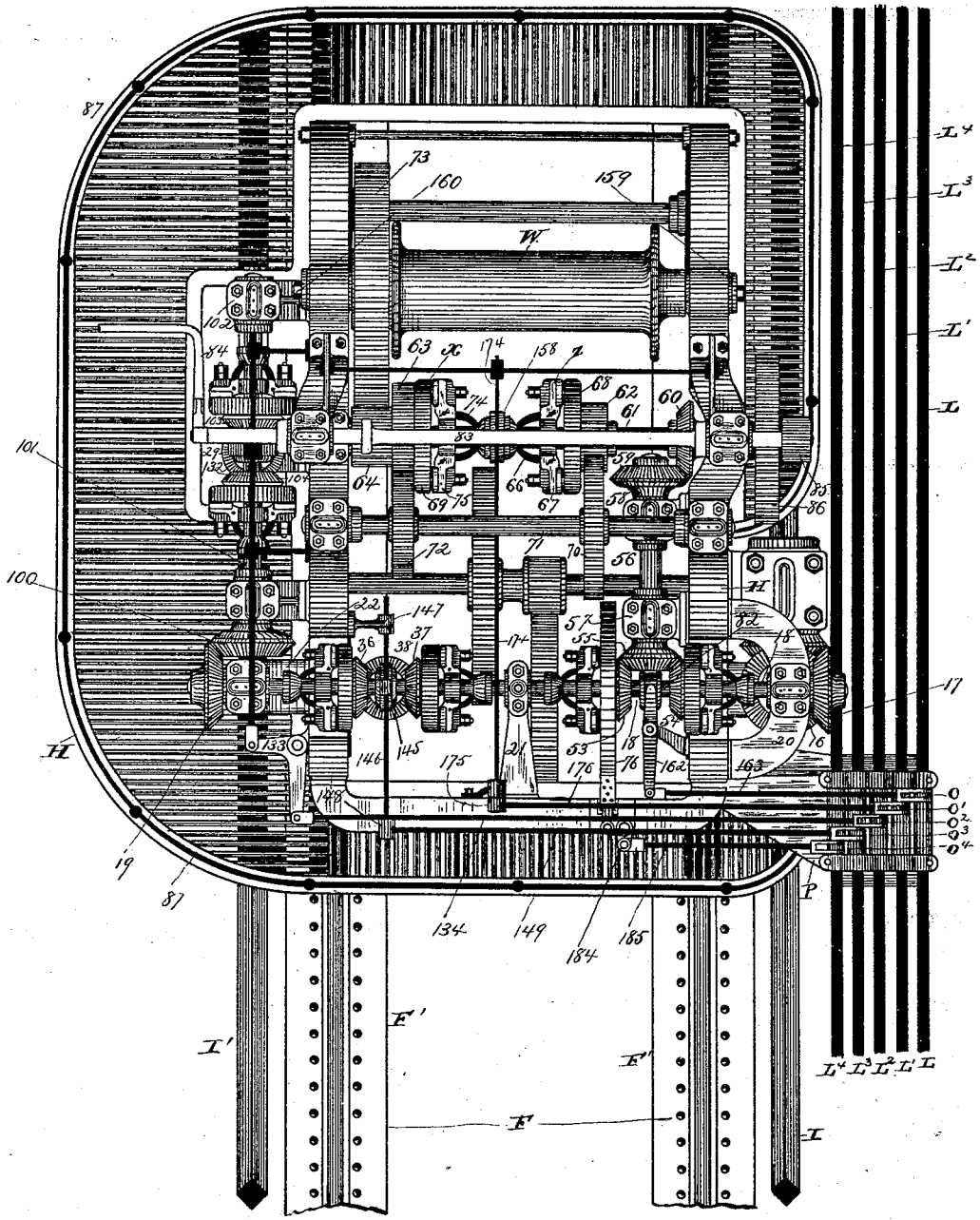
Figure, 8.

(No Model.)  17 Sheets—Sheet 8.
T. R. MORGAN, Sr.
CRANE.
No. 290,260.  Patented Dec. 18, 1883.
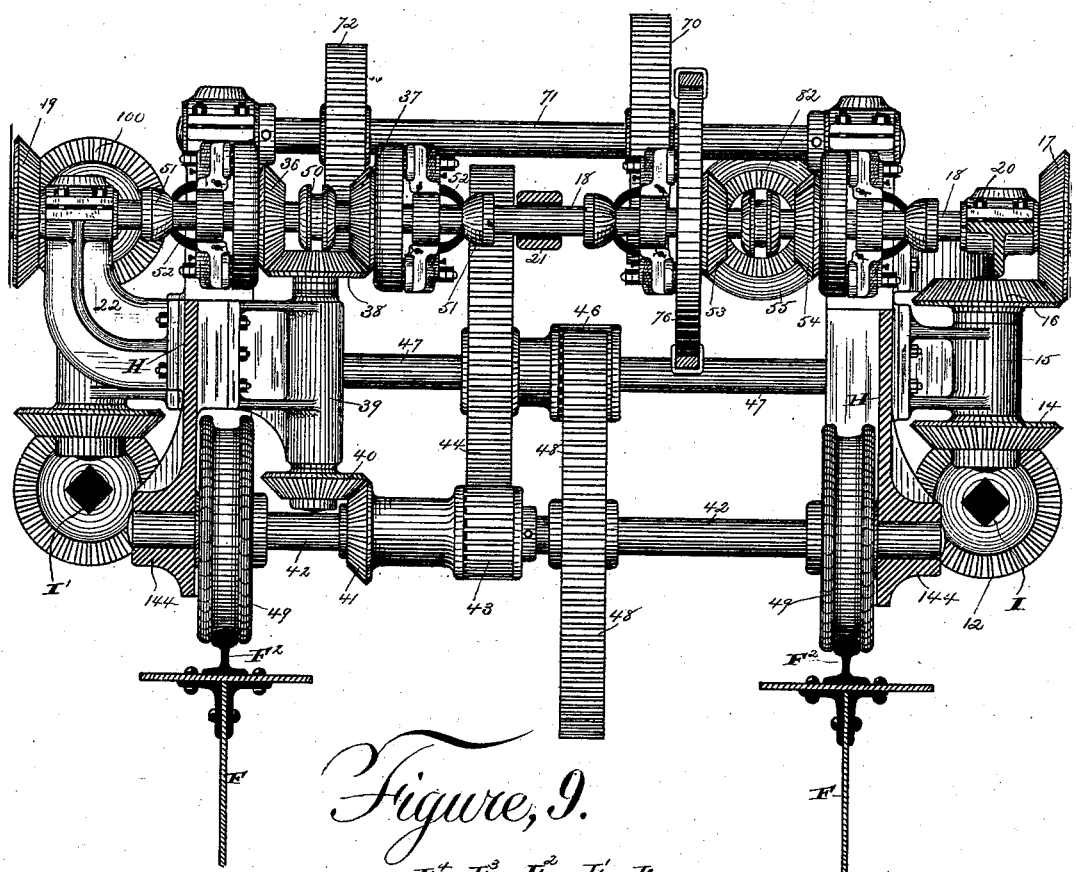
Figure, 9.
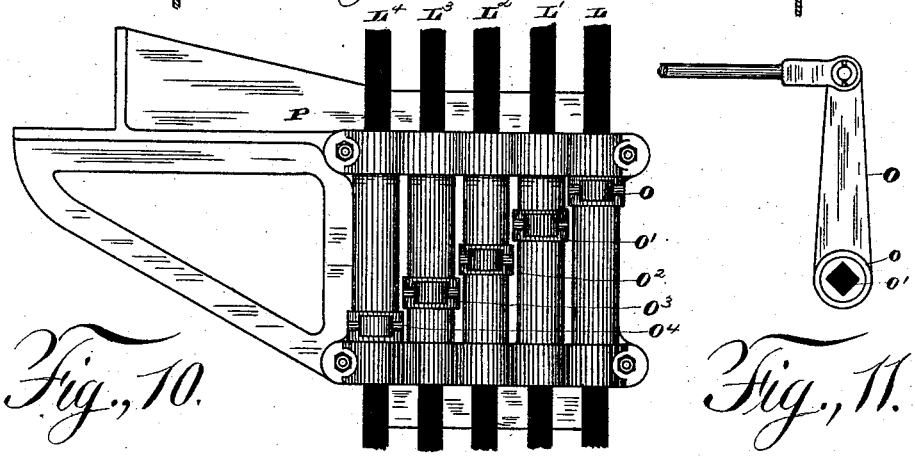
Fig., 10.  Fig., 11.

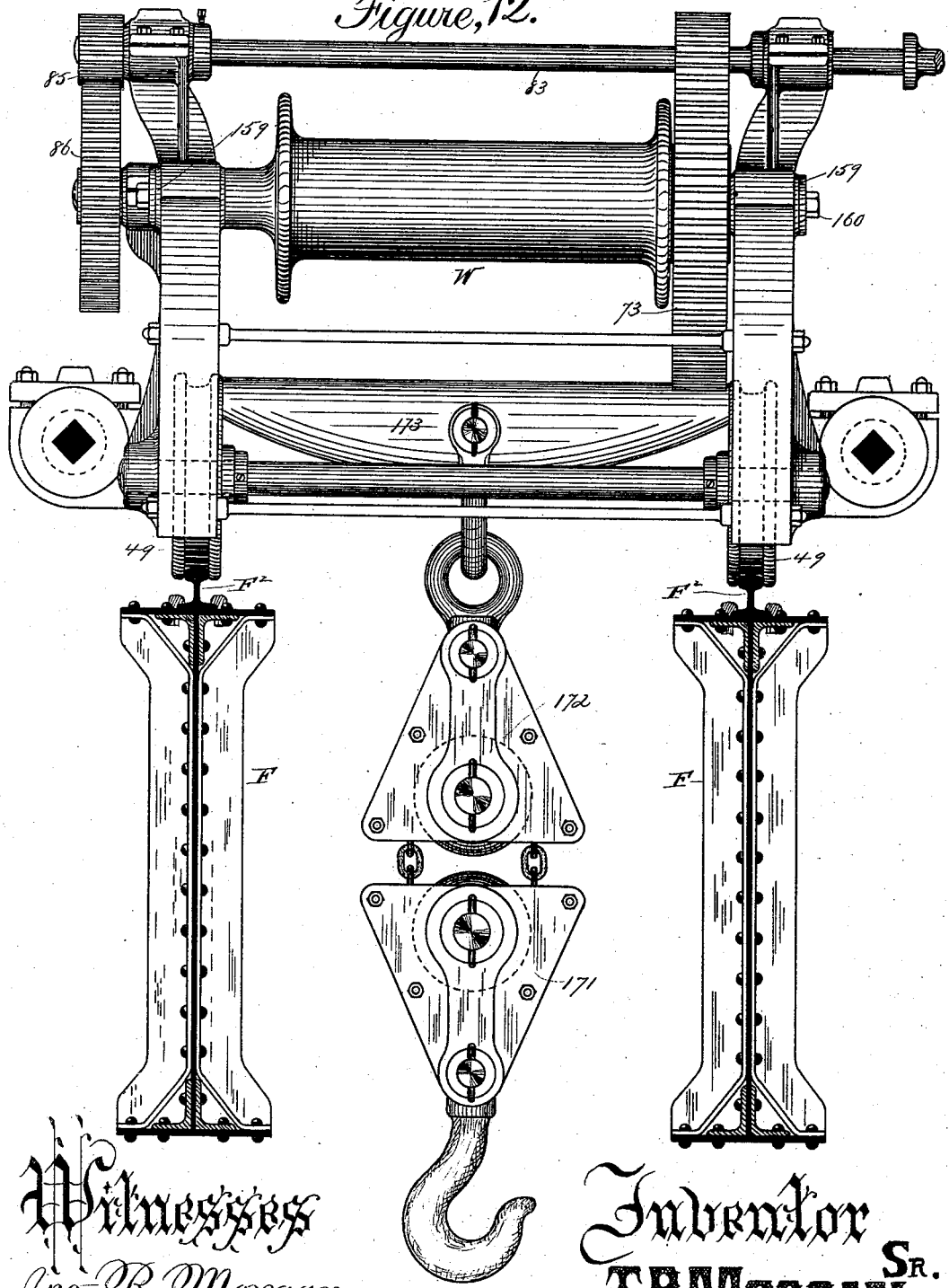

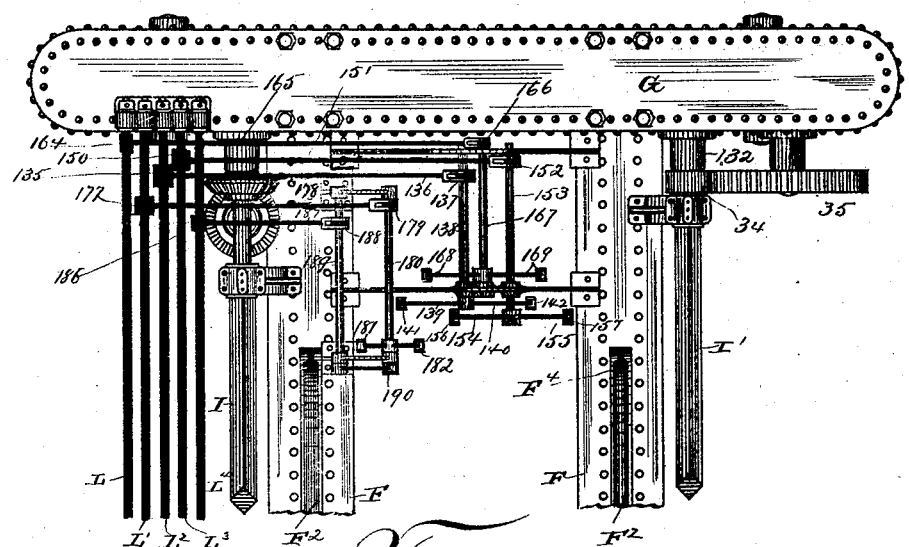

(No Model.) T. R. MORGAN, Sr. 17 Sheets—Sheet 11.
CRANE.
No. 290,260. Patented Dec. 18, 1883.
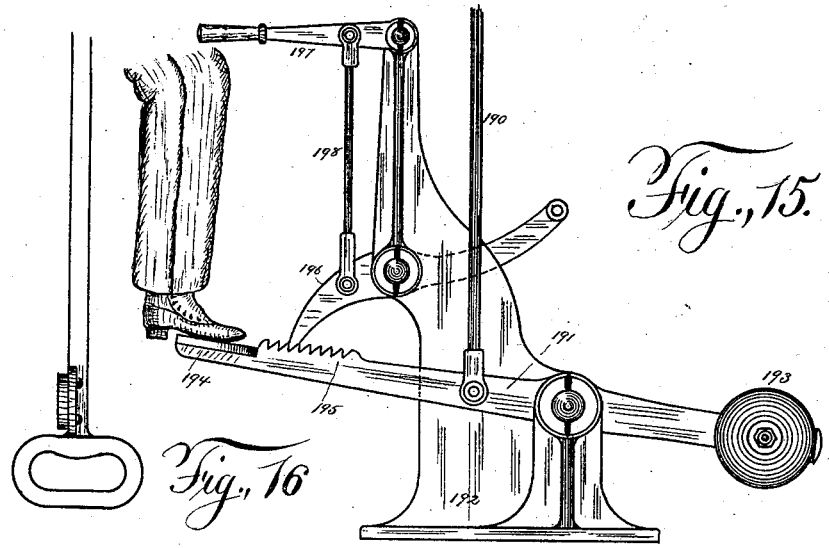
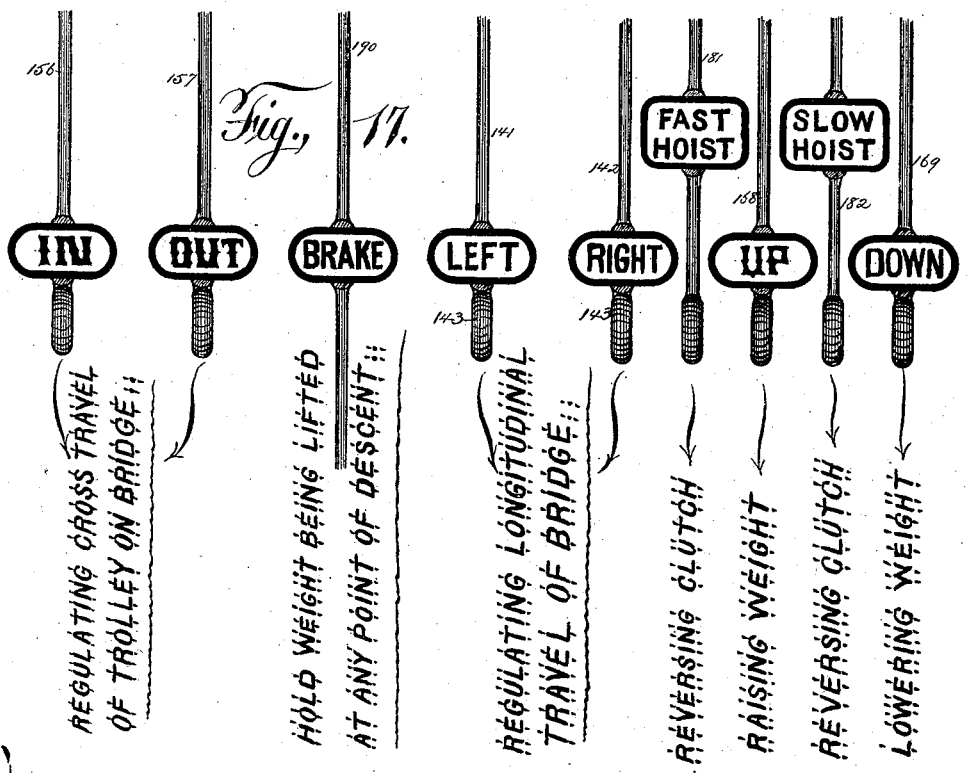

(No Model.) 17 Sheets—Sheet 12.

T. R. MORGAN, Sr.
CRANE.

No. 290,260. Patented Dec. 18, 1883.

Witnesses: Jno. R. Morgan, Henry Heer
Inventor: T. R. Morgan Sr.
By H. A. Supman, Atty.

(No Model.)  17 Sheets—Sheet 13.
T. R. MORGAN, Sr.
CRANE.
No. 290,260. Patented Dec. 18, 1883.
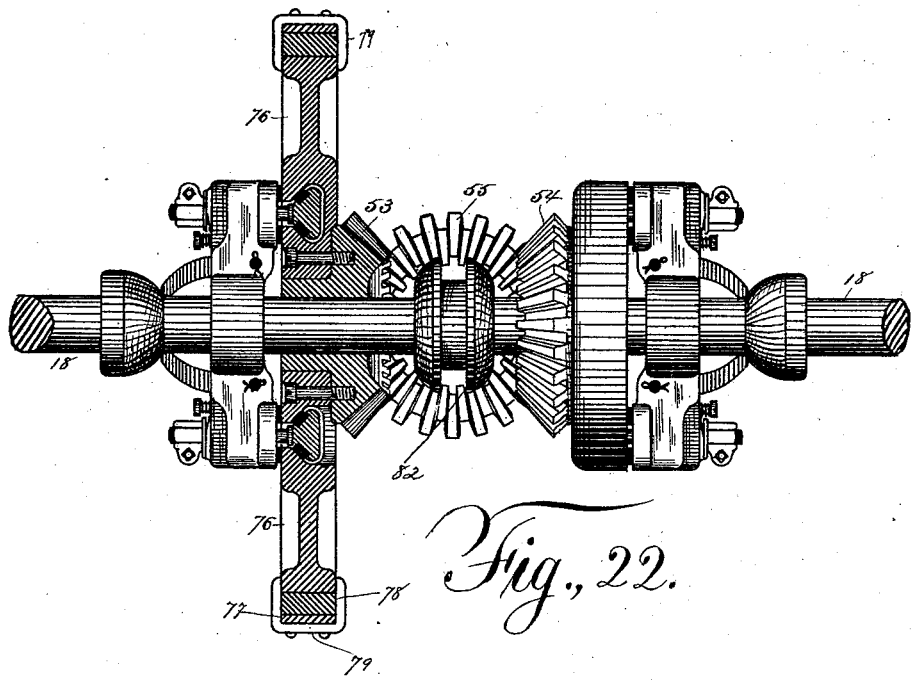
Fig., 22.
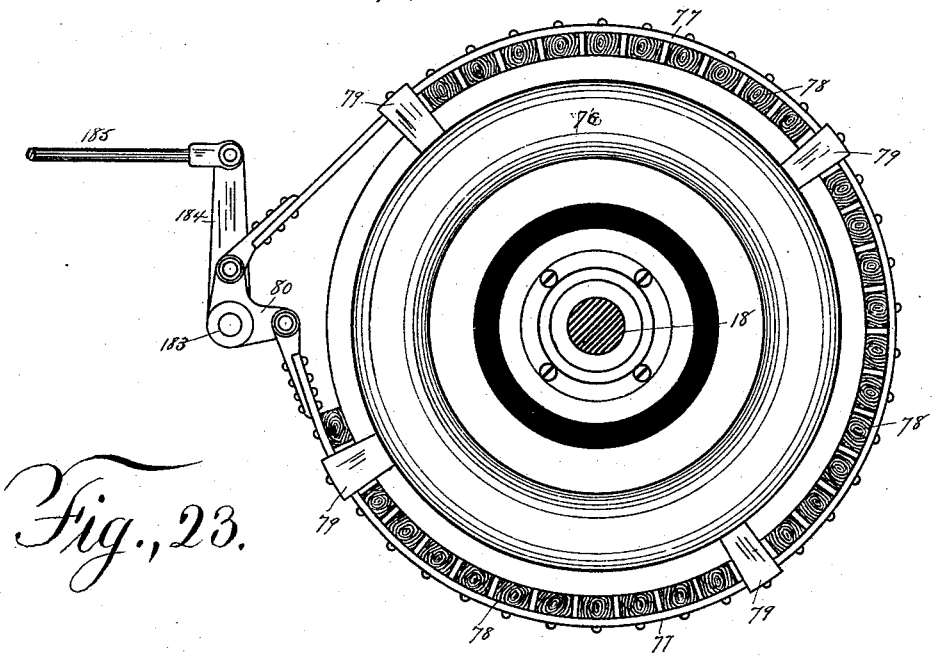
Fig., 23.
Witnesses  
Jno. R. Morgan  
Henry Heer
Inventor T. R. Morgan Sr.  
By H. A. Symons  
Atty.

(No Model.)  
T. R. MORGAN, Sr.  
CRANE.  
No. 290,260.  
17 Sheets—Sheet 14.  
Patented Dec. 18, 1883.
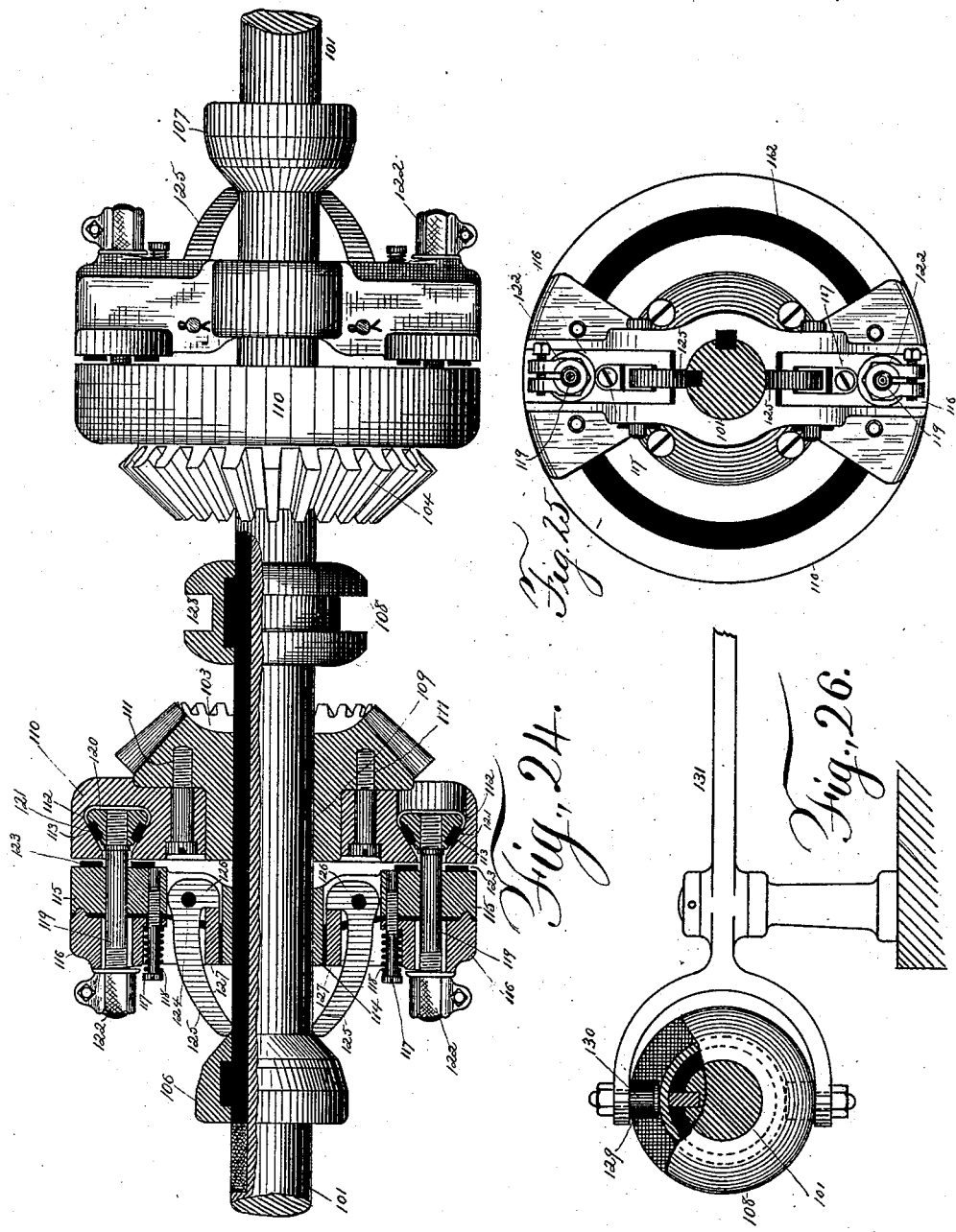

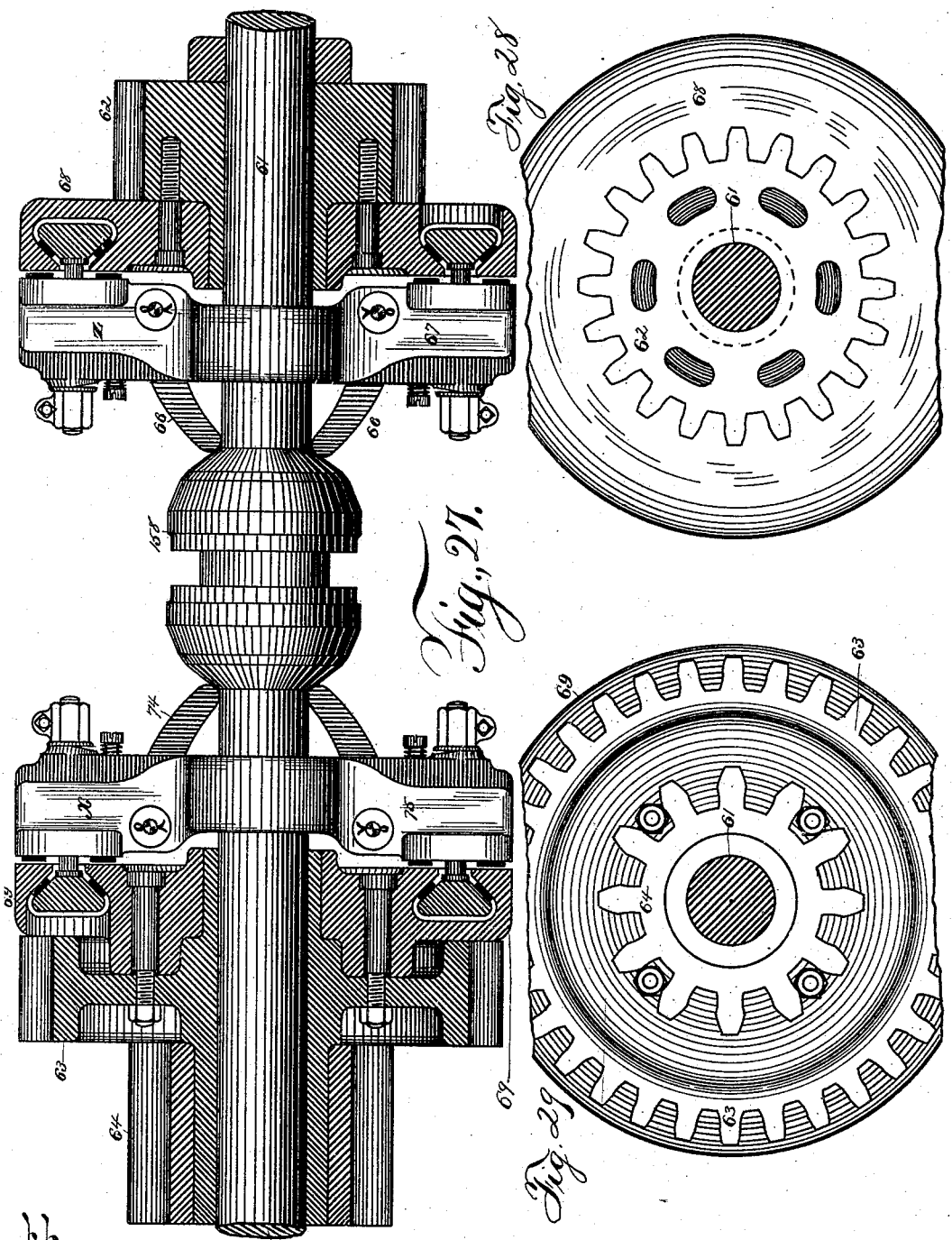

(No Model.) T. R. MORGAN, Sr.
CRANE.

No. 290,260. Patented Dec. 18, 1883.

(No Model.)  
T. R. MORGAN, Sr.  
CRANE.  
No. 290,260. Patented Dec. 18, 1883.
17 Sheets—Sheet 17.
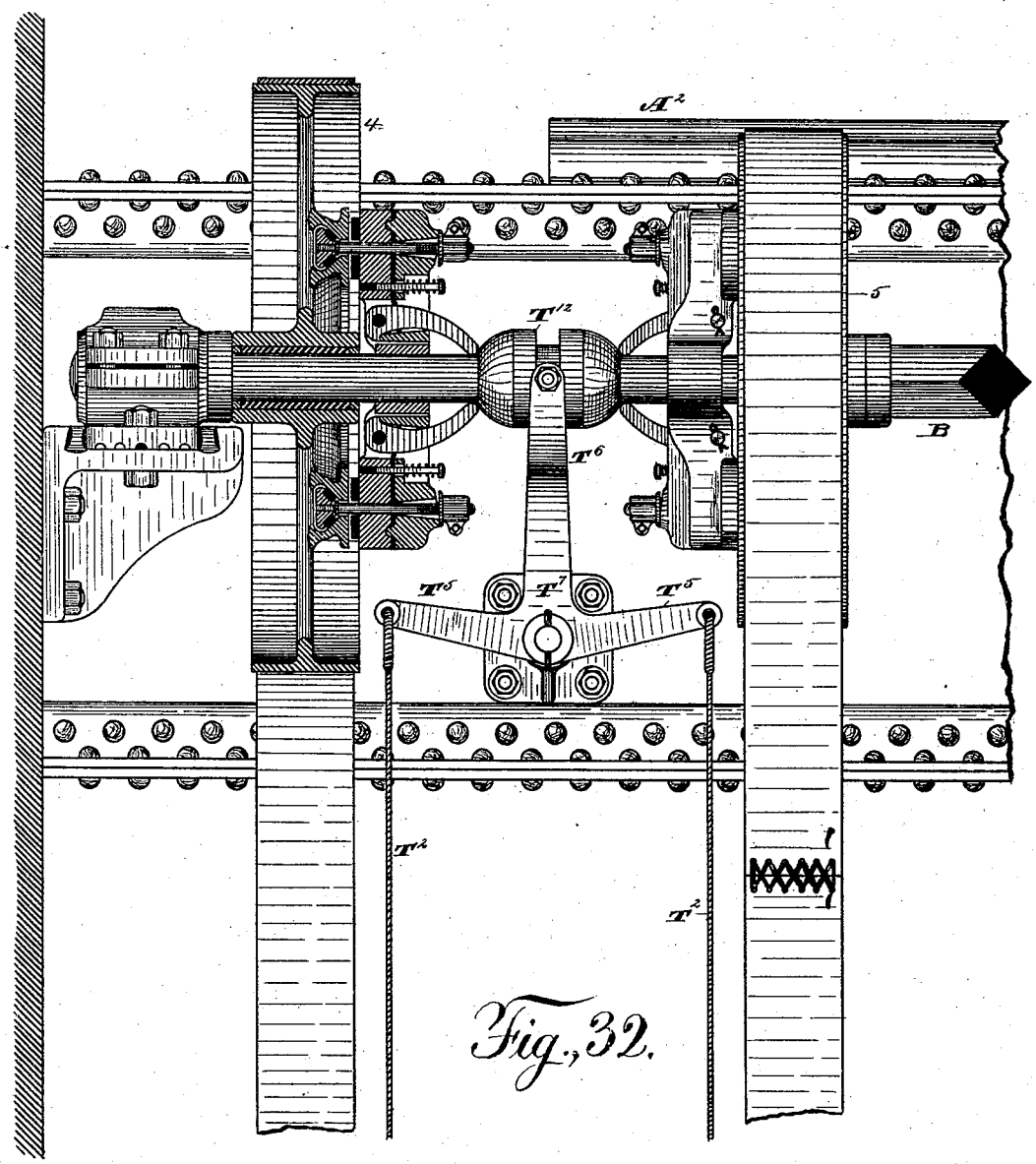
Fig., 32.
Witnesses Jno. R. Morgan  Henry Heer  
Inventor T. R. Morgan Sr.  
By H. A. Symon Atty.

UNITED STATES PATENT OFFICE.

THOMAS R. MORGAN, SR., OF ALLIANCE, OHIO.

CRANE.

SPECIFICATION forming part of Letters Patent No. 290,260, dated December 18, 1883.

Application filed October 31, 1883. (No model.)

*To all whom it may concern:*

Be it known that I, THOMAS R. MORGAN, Sr., of Alliance, in the county of Stark and State of Ohio, have invented certain new and useful Improvements in Cranes; and I do hereby declare the following to be a full, clear, and exact description of the invention, such as will enable others skilled in the art to which it appertains to make and use the same.

My invention relates to an improvement in overhead traveling cranes; and it consists in certain features of construction and combinations of parts, as will hereinafter be described, and pointed out in the claims.

Figure 18:
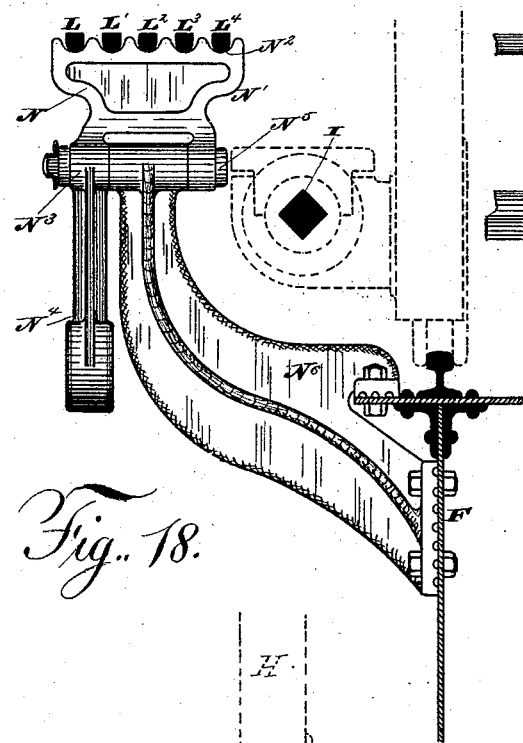
Figure 19:
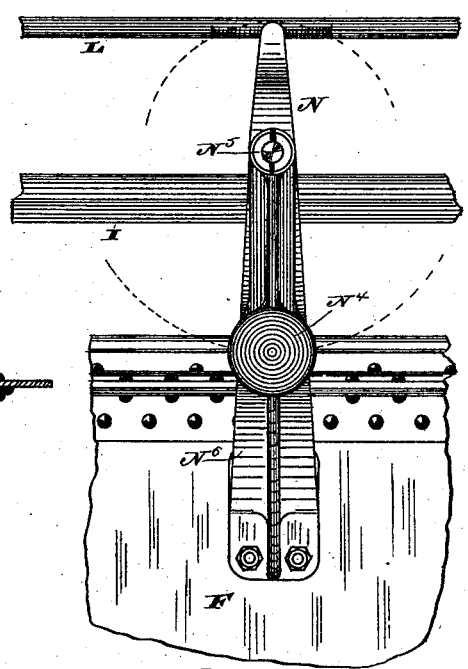
Figure 20:
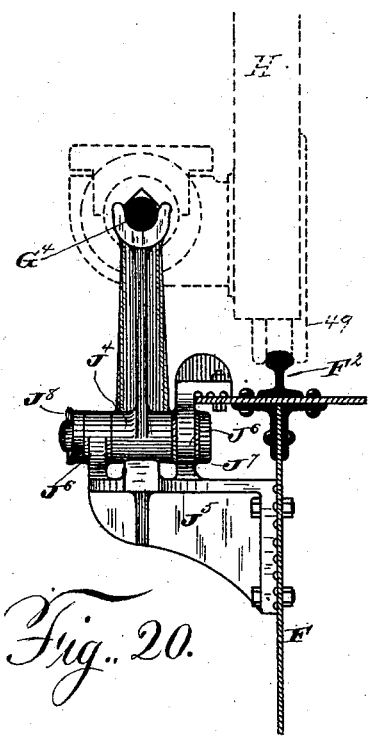
Figure 21:
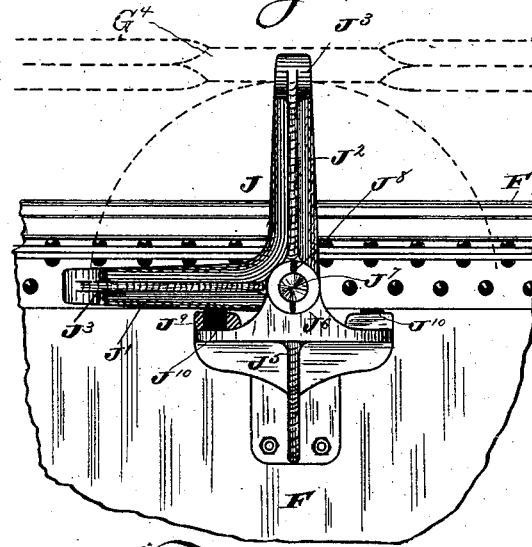
Figure 30:
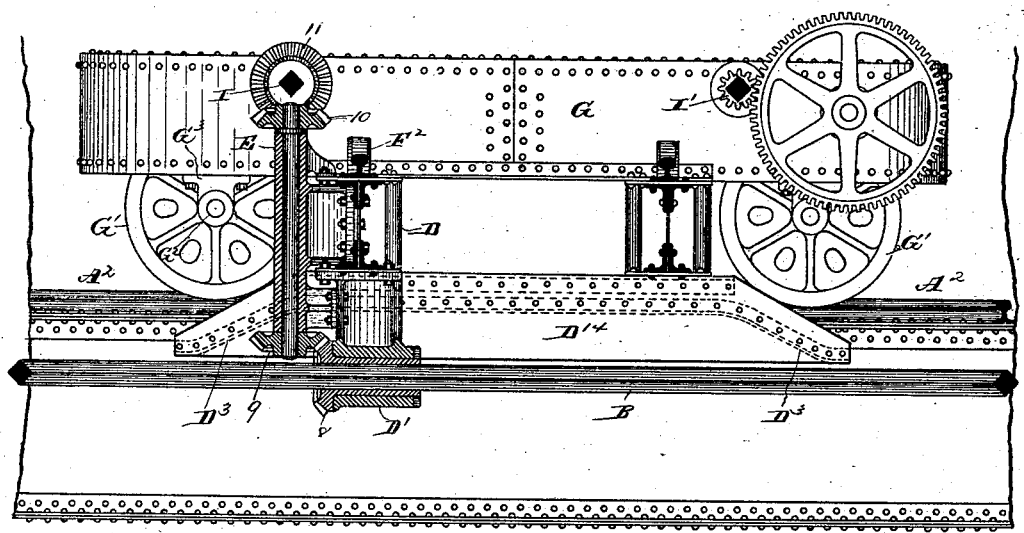
Figure 31:
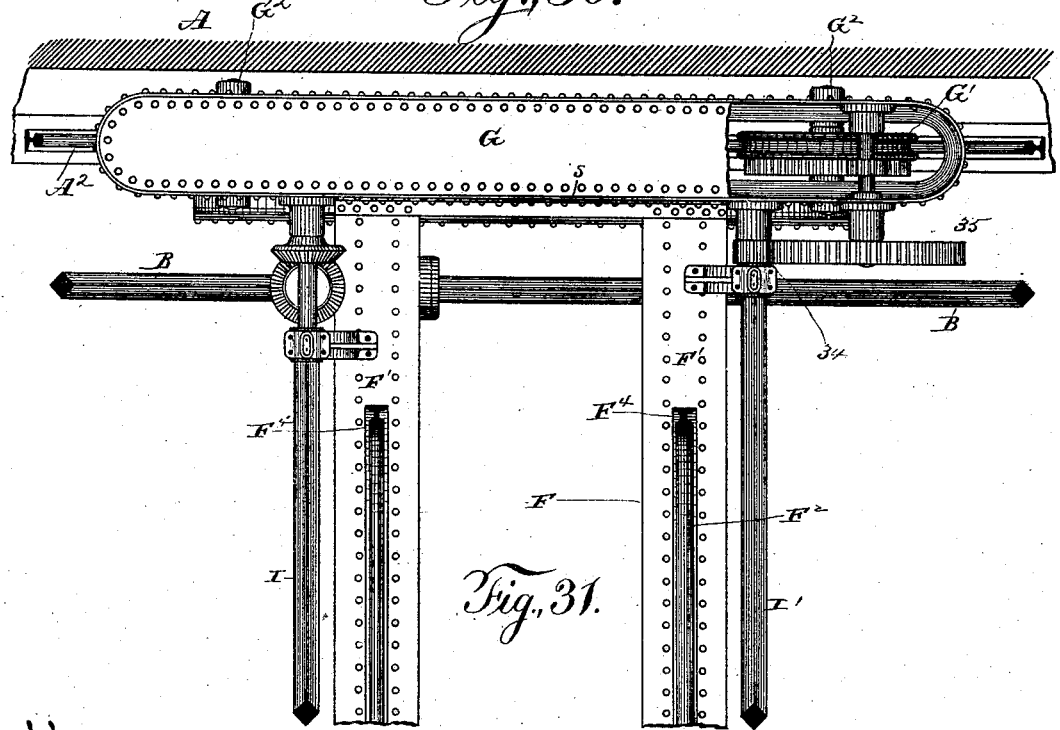

In the accompanying drawings, Figure 1 is a view in side elevation of the traveling bridge or crane with its hanging platform. Fig. 2 is a plan view of certain parts of the crane, sufficient to illustrate the devices for automatically stopping the crane when approaching the limits of its longitudinal travel, and also for stopping the travel of the trolley or hoisting-crab. Fig. 3 is a view in side elevation of the building, showing the end of the bridge or crane with its hanging platform and an endless rope for operating clutches for changing the speed of the main driving-shaft or stopping the crane at any point of its travel. Fig. 4 is an enlarged view in side elevation, showing the tumbler-bearings supporting the main driving-shaft and gearing for transmitting motion from the main driving-shaft to the shaft for driving the trolley or crab. Fig. 5 is an enlarged sectional view of the draw-bar with its anti-friction rollers employed for disengaging the tumbler-bearing from the main shaft. Fig. 6 is an enlarged view in side elevation of one side of the hoisting-crab or trolley. Fig. 7 is a similar view of the opposite side of the trolley. Fig. 8 is a plan view of the trolley. Fig. 9 shows one end of the same. Fig. 10 is a detached plan view of the bracket-bearing on the trolley, which supports five square rods, through which the trolley-clutches are operated. Fig. 11 is a detached view in side elevation of one of the levers attached to one of the square rods. Fig. 12 is an end view of the hoisting-crab or trolley, showing the hoisting-drum and blocks and extra attachment for operating by hand-power. Fig. 13 is a plan view of one end of the crane. Fig. 14 is a view in side elevation of the same. Fig. 15 is a detached view in side elevation of the brake-treadle supported within the hanging frame of the crane. Fig. 16 is a detached view in side elevation of the handle of one of the operating-rods. Fig. 17 is a front view of the several handles of the operating-rods. Fig. 18 is a detached view in side elevation of one of the pendulum bearing-brackets for supporting the series of small square rods, and Fig. 19 is a front elevation of the same. Fig. 20 is a view in side elevation of a right-angle bracket-bearing employed to support the shaft on the crane, and Fig. 21 is a front elevation of the same. Fig. 22 is a detached view, partly in side elevation and partly in section, of the friction-clutch and wheels employed for reversing the motion of the hoisting-drum and a brake-wheel for regulating the movement of said drum. Fig. 23 is a detached view in side elevation of the brake-wheel. Fig. 24 is a view, partly in side elevation and partly in section, of the friction-clutches and bevel-wheels for reversing the travel of the hoisting-crab, and Fig. 25 is an end view of the same. Fig. 26 is a detached view of the clutch-adjusting mechanism. Fig. 27 is a detached view, partly in side elevation and partly in section, of the friction-clutches and spur-wheels for changing the speed of the hoisting-drum. Fig. 28 is an end view of the right-hand clutch, and Fig. 29 is an end view of the spur-wheels on the left-hand clutch. Fig. 30 is a view in side elevation of one end of the crane. Fig. 31 is a plan view of one end of the crane. Fig. 32 is an enlarged view of the friction wheels and pulleys for regulating the speed of and stopping and starting the main driving-shaft.

A A represent the side walls of a building provided with ledges A' A', which may be built of masonry or of iron frame-work, and upon which are supported the tracks $A^2$. A square driving-shaft, B, is arranged parallel to the track $A^2$, and extends throughout the entire length of the building, and is supported at its opposite ends by wall bracket-bearings, and at intervals throughout the remaining portion of its length by the automatic tumbler-bearings C, which are preferably located about fifteen feet apart.

Tumbler-bearings C are each constructed as follows: C' is a casing securely bolted to the side of the building or frame-work $C^2$, attached thereto. Lever $C^3$ is pivoted to the upper portion of the casing C', and is provided at its outer end with a half-bearing, $C^4$, which engages the cylindrical bearing $C^5$ of the square main driving-shaft B, the latter being of square or angular shape in cross-section, except at intervals, where it is provided with cylindrical bearings $C^5$. The outer end of the lever $C^3$ is provided with a lug, $C^6$, with which engages the free end of the locking-lever $C^7$, for retaining the bearing in position.

To the opposite end of the locking-lever $C^7$ is pivoted at $C^8$ the draw-bar $C^9$, which latter extends through the top of casing C', and is provided at its upper end with the enlarged head B'. Shouldered bolts $B^2$ are secured one above the other to the head B' by means of the nuts $B^3$, and serve as journals for the anti-friction rollers $B^4$ $B^4$. A journal-bracket, D, depends from the under side of the bridge F, and has journaled in its lower ends the sleeve bevel-wheel 8, the sleeve portion D' of which is constructed to fit the square driving-shaft B, so as to slide lengthwise thereon, and to be rotated therewith. The sleeve is of sufficient length to span the cylindrical bearings on the shaft B, or, in other words, to engage the squared portion of the shaft at all times, so that when it is moved over one of the bearings it will continue to be rotated by the driving-shaft. As the crane bridge or girder F is moved longitudinally the length of the building, the beveled wheel 8 will be caused to slide over the entire length of the shaft B.

To the under side of the frame F is secured a depending plate, $D^{11}$, which is provided with a lateral flange, $D^2$, having inclined ends $D^3$. When the crane-frame F is moved longitudinally, the flange $D^2$ engages between the anti-friction rollers $B^4$, the inclined end $D^3$ of said flange operating to raise the draw-bar $C^9$ and elevate one end of the locking-lever $C^7$, and thereby disengage its free end from the lugs $C^6$ on the tumbler-bearing lever $C^3$, whereby both of said levers will drop into the position indicated by dotted lines, as shown in Fig. 4, and thus allow the bevel-wheel to slide past the bearing, when the opposite inclined end of the flange $D^2$ depresses the draw-bar $C^9$ and elevates the levers and locks them in the position indicated by full lines in Fig. 4. Thus it will be observed that the square main driving-shaft is supported at all times by its bracket-bearings, except at the particular bearing over which the bevel-wheel may be situated during the travel of the crane, and at such times the bearing is automatically moved out of the path of the bevel-wheel, and after the latter has passed is automatically moved back into its direct engagement with the shaft.

The operation of the tumbler-bearings is facilitated and friction greatly lessened by the employment of the anti-friction wheels $B^4$, that engage the flange-plate on the crane. Bevel-wheel 8 meshes into a like bevel-wheel, 9, which is keyed to the lower end of a vertical shaft that revolves in an elongated journal-bracket, E, secured to the girder or bridge F. The bridge F is composed of the two main girders F' F', which are secured at their opposite ends to cross-girder carriages or cradles by suitable bolts and angle-plates. These carriages or cradles G G are each composed of wrought-iron hollow box-sections, within the opposite ends of which are located the steel track-wheels G', which are made of large diameter, and provided with double flanges and intervening treads, the latter being turned perfectly true. Track-wheels G' are keyed to axles $G^2$, supported in long journal-boxes $G^3$, secured to the cradles or hollow girders G. Bridge F is provided with the tracks $F^2$, upon which travels the trolley or crab H, which is provided with four steel track-wheels, 49, constructed with double flanges, having intervening treads turned perfectly true, that rest upon the tracks $F^2$. The opposite ends of the tracks $F^2$ are upwardly turned, as at $F^4$, in order to serve as stops to limit the travel of the trolley or crab.

On opposite sides of the hoisting-crab or trolley are located the square shafts I I', which are situated at right angles to the main square driving-shaft B and parallel to the bridge F. Shafts I I' are journaled at opposite ends to bearings secured to the cradles or carriages G G, while their intermediate portions are provided at suitable intervals apart with the cylindrical bearings $G^4$, with which engage the right-angle bearing-brackets J, enlarged views of which are shown in Figs. 20 and 21. These brackets J consist of the arms J' $J^2$, arranged at right angles to each other, and cast in a single piece, with half-bearings $J^3$ at their outer ends and a sleeve-bearing, $J^4$, at their point of intersection. Brackets $J^5$ are secured to the bridge F, and provided with bearings $J^6$, through which is inserted the journal $J^7$, upon which rotates the sleeve $J^4$ of the bearing-brackets J. Journals $J^7$ are retained in place by means of pins $J^8$ or other suitable fastening devices. Brackets $J^5$ are provided on opposite sides of the journal-bearing with recesses $J^9$, in which are secured the wooden, rubber, or other cushions, $J^{10}$, which serve to cushion the fall of the arms J' $J^2$. In the travel of the crab or trolley from right to left a projection on the trolley will strike the arm J', disengaging it from its cylindrical bearing on the shaft I and allowing a sliding bevel-wheel, 12, to pass over said bearing when the arm $J^2$ comes to its vertical position, as represented in Fig. 19, and supports the shaft.

Extending lengthwise of the frame or crane F are five small square rods, L L' $L^2$ $L^3$ $L^4$, which are supported at their opposite ends in bracket-bearings M, secured to the cradles or carriages G G, and at fixed distances apart by the pendulum-brackets N, enlarged views of which may be seen in Figs. 18 and 19. Brackets N each consist of a support, N', having five half-bearings, $N^2$, in which rest the square rods and sleeve-bearings N³ and weighted depending bar N⁴, said parts being preferably cast in a single piece. The sleeves N³ are journaled on an axle, N⁵, mounted on the upper end of a bracket, N⁶, attached to the frame F. Bracket P is secured or attached to the crab or trolley, and has journaled therein the sleeved ends o of the short vertical arms O O' O² O³ O⁴, the sleeve portions o each being provided with a square hole, o', for the reception of the square rods, whereby the sleeves are adapted to slide on the rods and be rotated by the same during any portion of the travel of the crab or trolley. When the trolley is moved to and fro on the bridge F, the bracket P engages the pendulum-bracket N, imparts a rotary movement thereto, thereby allowing the bracket P to move past the pendulum-bearing, when the weighted arm N⁴ will cause the pendulum-bearing to assume a vertical position again, as represented in Figs. 18 and 19, and support the five small square rods. Rotary motion is transmitted to the shaft I from the main square driving-shaft B by means of the sliding bevel-wheel 8, the bevel-wheel 9, which meshes therewith, bevel-wheel 10, and bevel-wheel 11, the latter being keyed to square shaft I.

Mounted on the square shaft I is a sleeved bevel-wheel, 12, which is provided with a square hole adapting it to fit and slide upon the square shaft I and to be continuously rotated therewith. This sleeved bevel-wheel is journaled in a bracket, 13, secured to the side of the hoisting-crab or trolley H. Bevel-wheel 12 meshes into a bevel-wheel, 14, which is keyed to a vertical shaft journaled in the bracket 15, and to the upper end of the same shaft is keyed a bevel-wheel, 16, which meshes into a like bevel-wheel, 17, keyed to one end of the transverse shaft 18, journaled in projecting brackets 20 21 22, attached to the crab or trolley H. Thus a continuous rotary motion is imparted to the transverse shaft 18.

To the opposite end of the shaft 18 is keyed a bevel-wheel, 19, which meshes into a bevel-wheel, 100, keyed to a shaft, 101, journaled in bearings 102, attached to the trolley-frame.

Mounted upon the shaft 101 is a double clutch, constructed as follows: Bevel-wheels 103 and 104 are each loosely sleeved upon the shaft 101, and as each bevel-wheel is connected to clutch mechanism of the same construction an explanation of one of the clutch mechanisms will suffice, and for a clear understanding of the same reference is made to enlarged views 24, 25, and 26. The shaft is provided with a groove, in which is inserted a spline having the cones 106 and 107, secured at its opposite ends, and the shifting-collar 108, attached to its central portion and between the bevel-wheels 103 and 104. Each one of said bevel-wheels is provided with a sleeve, 109, forming an elongated loose bearing for the bevel-wheel on the shaft.

Upon the sleeve 109 is secured the circular plate 110 by means of a key and the screws 111. Plate 110 is provided with an annular groove, 112, having converging walls 113.

To the shaft is rigidly keyed the sleeve 114, which has cast therewith the frame or bar 115, whereby the latter rotates with the shaft. A cross-bar or supporting-plate, 116, is retained in engagement with the rear surface of the rotating bar or plate 115 by means of the screws 117 and spiral springs 118, said springs serving to force the plate 116 against the plate 115, and allowing said plates to be separated by a force applied in opposition to the tension of said springs. Bolts 119 extend through openings in the plates or supports 115 and 116, said bolts having conical blocks 120 secured thereto. These blocks have friction-blocks 121, secured in recesses formed in their converging walls 113. The outer ends of the bolts 119 are screw-threaded and provided with adjusting-nuts 122. Friction-blocks 123 are secured to the inner face of the cross bar or plate 115.

To the cross bar or plate 115 are pivoted at 124 levers, the long arms 125 of which engage the cone 106, while the short arms 126 of which engage the sleeve-bearing 127 of the cross bar or plate 116.

In the annular groove 128 of the shifting collar are located anti-friction rollers 129, which are journaled upon pins 130, attached to the opposite arms of the clutch-lever 131, which latter is connected to the sliding rod 132. When the collar 108 is located centrally between the bevel-wheels 103 and 104, both of said bevel-wheels are idle. When the collar is moved to the right, cone 106 engages the long arms 125 of the levers, moving them away from each other, and at the same time forcing the cross bar or plate 115 toward the clutch-disk 110 and causing the friction-blocks 123 to engage therewith. At the same time the short arms 126 engage the sleeves or bearings 127, thereby forcing the plate 116 outwardly or away from plate 115, and thus move the friction-blocks 121 in contact with the converging walls 113; hence it will be observed that the bevel-wheel 103 is firmly locked to the cross bar or plate 115, that is keyed to and revolves with the axle, by two sets of frictional surfaces, which are forced in opposite directions. The clutch-collar 108, being moved in the opposite direction, allows the spiral springs 118 to draw the plates 116 and 115 together, and unlock or disengage the bevel-wheel 103, and at the same time locking the bevel-wheel 104 to the shaft, in a manner hereinbefore described.

To one side of the trolley or crab H is secured a journal-bracket, 30, in which is mounted or journaled a shaft having a bevel-wheel, 29, keyed to its upper end, which meshes into the bevel-wheels 103 and 104 of the double clutch hereinbefore described. To the lower end of said shaft is keyed a bevel-wheel, 31, that meshes into a bevel-wheel, 32, that is sleeved upon the square shaft I' and supported by the bracket 33, attached to the side of the trolley or crab. The shaft I' is provided with the right-angle tumbler-bearings J, adapted to operate in a manner hereinbefore described. The opposite ends of the shaft I' are supported in journal-brackets attached to the cradles G, the shaft having keyed thereto at its opposite ends the pinions 34, which mesh into spur-wheels 35, keyed to short shafts supported by inside and outside journals secured to the cradles G G. Said small shafts have pinions keyed thereto, which mesh into spur-wheels securely fastened to the track-wheels at one end of each of the cradles or carriages G G. These wheels and pinions serve to multiply the power and insure a parallel longitudinal travel of the crane. Sliding rod 132, for operating the double clutch on the shaft 101, is pivoted at one end to the bell-crank lever 133. To the other arm of this bell-crank lever is pivoted one end of a connecting-rod, 134, the opposite end of which is pivoted to the upper end of the arm O², which is sleeved upon the square rod L².

To the rod L², at a point near the cradle G, is secured an arm, 135, to the lower end of which is pivoted one end of the connecting-rod 136, the opposite end of which is pivoted to the vertical arm 137, secured to the shaft 138.

To the opposite end of the shaft 138 are secured the lateral arms 139 and 140, to the outer ends of which are respectively pivoted the upper ends of the pull-rods 141 and 142. The lower ends of these rods are provided with handles 143.

On the rod 141, adjacent to the handle, is secured a small placard, upon which is printed the word "Left," while on a similar placard, attached to the lower end of pull-rod 142, is printed the word "Right." These pull-rods, together with others, the functions of which will be hereinafter described, extend down within easy reach of the operator, who will stand on the hanging platform R, suspended from the frame or bridge F, where full view can be had of the hoisting apparatus. When the handles 143 are in the same horizontal plane, the bevel-gears of the double clutch on shaft 101 are retained out of gear from the bevel-wheel 29, through which longitudinal motion is transmitted to the frame or bridge F by the square shaft I' and the pinions and gear-wheels hereinbefore described, and thus the frame or bridge F of the crane is retained at rest. By pulling down upon the handle attached to the rod 142, one of the bevel-wheels of the double clutch will be caused to mesh with the bevel-wheel 29 and rotated in one direction, thereby revolving the shaft I', and through the pinions and gearing, hereinbefore described, cause the bridge or frame F of the crane to travel to the right. By pulling down upon the handle connected with the pull-rod 141, the other bevel-wheel of the double clutch on shaft 101 will be thrown into gear with bevel-wheel 29, and thus rotate the shaft I' in an opposite direction and cause the bridge or frame F of the crane to travel toward the left.

Thus it will be observed that by means of the two pull rods 141 and 142 the operator, standing upon the hanging platform R, is enabled to cause the bridge or frame F to travel in either direction and to arrest its movement at any desired point throughout the limits of its travel.

In the side walls of the building are secured small wrought-iron brackets T, each provided with two eyes, T', through which is inserted the cord or rope T², which passes around a pulley, T³, located at one end of the building, and around pulleys T⁴, at the opposite end of the building, the ends of said cord being secured to the arms T⁵ of a T-lever, T⁷, which is fulcrumed to a bracket secured to the wall. The central arm, T⁶, of this lever is forked, and engages a sliding collar, T¹², of a clutch, similar in construction to that hereinbefore described, and adapted to lock either the large or small friction-pulley 4 or 5 to the main driving-shaft. These friction-pulleys are connected by suitable belts with pulleys on the engine-shaft; hence the operator, by manipulating the cord T², which he is enabled to do while standing on the hanging platform, may cause the bridge F to travel fast or slow, as may be desired.

Instead of locking the large and small pulleys to the main driving-shaft B, the latter may be provided with fixed pulleys, and the engine-shaft with the large and small pulleys, and the cord T² and shifting-lever suitably arranged for operating the same.

At opposite sides and ends of the building are secured wrought-iron rods U, which extend inwardly and away from the walls a sufficient distance to engage the vertical arms I², attached to the opposite ends of the rod L². When the bridge or frame F reaches the terminus of its travel, the rods U engage the arms I² and partly rotate the square rod L², whereby the latter, through the connecting-rods hereinbefore described, unlocks the bevel-wheels 103 and 104 from their shaft, and thus stops the further travel of the bridge or crane. This arrangement of parts not only limits the longitudinal travel of the crane, but prevents the occurrence of accidents in the event that the operator neglects to properly manipulate the pull-rods that govern the action of the crane.

Having described the construction and arrangement and mode of operation of the different parts of the crane employed in causing the bridge or frame F to move longitudinally, I will now proceed to describe the parts employed for causing the crab or trolley to travel to and fro on the bridge.

From the explanation heretofore made it will be observed that the main square driving-shaft B imparts a continuous rotary movement to the square shaft I and the cross-shaft 18, and that the bevel-wheels of the friction-clutches are loose on their shafts and are brought into operation by locking them to their shafts.

On the cross-shaft 18 is located a double clutch, provided with bevel-wheels 36 and 37, which are of the same diameter and mesh into a like bevel-wheel, 38, keyed to the upper end of a vertical shaft supported in a journal-bracket, 39, attached to the inside of the hoisting-crab or trolley H, as clearly illustrated in Fig. 9.

To the bottom of the vertical shaft is keyed a bevel-wheel, 40, that meshes into a bevel-wheel, 41, that runs loosely on the shaft 42. Bevel-wheel 41 is formed on one end of a sleeve and the pinion 43 on its opposite end, the bevel-wheel, pinion, and sleeve being formed of a single casting and secured against endwise displacement on the shaft 42 by means of collars fastened to said shaft. Pinion 43 meshes into a spur or gear wheel, 44, which is keyed to one end of a sleeve-pinion, 46. The gear-wheel 44 and pinion 46 are both keyed to the intermediate shaft, 47. Pinion 46 meshes into a gear-wheel, 48, which is keyed to the axle 42, which latter is supported at its opposite ends in long journals 144, cast or attached to the side frames of the crab or trolley, while the track-wheels 49 are keyed to said axle.

Within the annular groove of the sliding collar 50 of the double clutch engages a forked rod, 145, secured at one end to the rock-shaft 146, the latter being supported at one end by a bracket, 147, and provided at its opposite end with an arm, 148, to which is pivoted one end of a connecting-rod, 149, the opposite end of which is pivoted to the arm O³, sleeved upon the square rod L³.

To the end of the square rod L³ is secured an arm, 150, having a connecting-rod, 151, pivoted to its lower end, the opposite end of said connecting-rod being pivoted to the arm 152, attached to the rock-shaft 153, the opposite end of which is provided with the lateral arms 154 and 155. Pull-rods 156 and 157 are pivoted at their upper ends to the lateral arms 154 and 155. These pull-rods extend down within easy reach of the operator standing on the hanging platform. The lower end of pull-rod 156 is provided with a handle and with a placard or plate, having printed thereon the word "In," while the lower end of the pull-rod 157 is provided with a similar plate or placard, having printed thereon the word "Out."

As the double clutch on the shaft 18, provided with the bevel-wheels 36 and 37, is of the same construction as the clutch shown in Fig. 24, a detail description of which has been given, it will not be necessary to duplicate this description in order to afford a clear understanding of its construction and operation.

When the handles of the pull-rods 156 and 157 are situated in the same horizontal plane, both bevel-wheels 36 and 37 of the double clutch will be loose on the shaft 18, whereby the trolley or crab will be retained at rest, or may be stopped at any portion of its travel by bringing the handles referred to to the position specified. By pulling down on the rod 156 the bevel-wheel 37 of the clutch will be locked to its shaft 18, and, through the intermediate gearing described, rotate the track-wheels 49 and cause the trolley or crab to travel transversely across the building on its bridge F. By pulling down upon the rod 157 the bevel-wheel 36 is locked to its shaft 18, while the bevel-wheel 37 is disengaged therefrom, and, through the intermediate gearing hereinbefore described, the track-wheels 49 are revolved in the opposite direction, thereby causing the trolley or crab to travel in the opposite direction over the bridge F and to the opposite side of the building. Thus it will be observed that the operator on the hanging platform, by properly manipulating the pull-rods 156 and 157, is enabled to cause the trolley or crab to travel in either direction and to stop it at any point of its travel; and, further, that the movement of the crab or trolley is made independent of the movement of its supporting-bridge.

To the projecting bracket P, attached to the trolley, are secured the two wrought-iron angle-frames 3, which project over the square rods L. When the trolley or crab reaches the limit of its travel in one direction, one of the angle-frames 3 will engage the upright arm 158, attached to the square rod L³, partly rotating the same, and through the connecting devices hereinbefore described disengage or unlock the bevel-wheels 36 and 37 of the double clutch on shaft 18, and thus automatically stop the crab or trolley. The same operation is effected at the opposite end of the bridge F, whereby the trolley is automatically stopped when it reaches its limit of travel in either direction, thus avoiding accidents that might otherwise result through the negligence or inattention of the operator.

I will now proceed to describe the construction and arrangement of parts for operating the hoisting and lowering drum on the trolley or crab in both directions and at different rates of speed.

On the right-hand end of the shaft 18, inside of the trolley, as represented in Fig. 8, is a double friction-clutch, enlarged views of which are shown in Figs. 22 and 23. This double clutch is provided with the bevel-wheels 53 and 54, which are of equal diameter and mesh into a like bevel-wheel, 55, keyed to one end of the shaft 56, supported in journal-brackets 57 and 58, attached to the inside of the trolley-frame.

To the opposite end of the shaft 56 is keyed a bevel-wheel, 59, that meshes into a like bevel-wheel, 60, keyed to the shaft 61.

Upon the shaft 61 are located the two friction-clutches X and Z, enlarged views of which are shown in Figs. 27, 28, and 29.

To the face-plate 68 of the clutch Z is secured the pinion 62, which is loosely sleeved upon the shaft 61, and is locked to the clutch and caused to rotate with the shaft by shifting the grooved conical-ended sleeve 158, which operates to separate the curved levers 66 of the clutch, the several parts of which are constructed to operate in the same manner as the clutch shown in Fig. 24.

To the friction-clutch X is secured the gear-wheel 63 and pinion 64, said gear-wheel 63 being secured to the face-plate 69 of the clutch X. By moving the conical-ended sleeve 158 to the left, the curved levers 74 are separated, thereby locking the gear-wheel 63 and pinion 64 to the clutch-bar 75, which is keyed to the shaft 61, and hence causing said gear-wheel and pinion to rotate with the shaft. As the clutch X is of the same construction as that shown in Fig. 24, a detail description of the construction and arrangement of its parts is not necessary.

When it is desired to raise or lower the weight on a slow speed, the clutch-sleeve 158 is shifted, so as to lock the pinion 62 to the clutch Z, and rotate therewith. Pinion 62 meshes into a gear-wheel, 70, keyed to an intermediate driving-shaft, 71, journaled at its ends in bearings attached to the side frames of the trolley or crab.

To the opposite end of the shaft 71 is keyed a gear-wheel, 72, that meshes into the gear-wheel 63, that is attached to the face-plate 69 of the clutch X, whereby said face-plate is caused to revolve with the gear-wheel. Pinion 64, which is attached to gear-wheel 63, and revolves therewith, meshes into the gear-wheel 73, which latter is keyed to the sleeved end of the drum W, and thus rotates the latter. The chain-drum W revolves on a steel shaft supported at its ends in bearings cast on the side frames of the trolley, and is retained in place by the large wrought-iron washers 159 and bolts 160, the latter being screwed into the drum-shaft.

To raise or lower the weight by fast speed the conical-ended sleeve 158 is moved on the shaft 61, so as to separate the curved levers 74 of the clutch X, and thereby lock the gear-wheel 63 and pinion 64 to the clutch-bar 75, that is keyed to the shaft, and transmit power directly from the pinion 64 to the gear-wheel 73 on the chain-drum W.

The gearing for rotating the chain-drum in opposite directions is operated as follows: Between the bevel-wheels 53 and 54 of the double clutch on shaft 18 is located the grooved sleeve 82, in which engage the forked ends of the shifting-lever 162, to the outer end of which is pivoted the connecting-rod 163, the opposite end of which is pivoted to the arm O, sleeved upon the square shaft L. To the end of the square shaft L, near the cradle G, is secured an arm, 164, to which is pivoted one end of the connecting-rod 165, the opposite end of which is pivoted to an arm, 166, attached to the rock-shaft 167. To lateral arms attached to rock-shaft 167 are pivoted the upper ends of the pull-rods 168 and 169. To the lower end of the pull-rod 168 is attached a handle, and a plate or placard, on which is printed the word "Up," while to the lower end of the pull-rod 169 is attached a similar handle, and a plate or placard having printed thereon the word "Down." When the handles of the pull-rods 168 and 169 are in the same horizontal plane, the bevel-wheels 53 and 54 will be retained out of engagement with the shaft 18, and thus the chain-drum W will be retained at rest. By pulling down upon the handle of the pull-rod 168 the bevel-wheel 54 will be locked to the clutch, and thereby revolve, and through the gearing hereinbefore described rotate the chain-drum W in a direction to wind up chain 170, one end of which is attached to the drum W, and extends down around the pulley in the movable block 171 and up around the pulley in the stationary block 172, the latter being suspended from a cross-bar, 173, attached to the crab or trolley.

To lower the weight, the operator pulls down on the rod 169, which operates through the levers and connecting-rods hereinbefore described to lock bevel-wheel 53 to its clutch, and thereby rotate, through the bevel-wheel 55, the shaft 56 in an opposite direction, and through the connecting-gearing hereinbefore described to rotate the chain-drum in the opposite direction and lower the weight.

To change the speed of the hoisting-drum, either in raising or lowering the weight, the following devices are employed: To the rock-shaft 174 is secured a forked lever that engages in the annular groove of the shifting-collar 158, located between the clutches X and Z. To the opposite end of the rock-shaft 174 is secured an arm, 175, to which is connected one end of a connecting-rod, 176, the opposite end of which is pivoted to an arm, O', sleeved upon the square rod L'. To the square rod L', near the cradle G, is attached an arm, 177, to which is pivoted one end of a connecting-rod, 178, the opposite end of which is pivoted to an arm, 179, secured to a rock-shaft, 180, provided with lateral arms, to which are pivoted the upper ends of the pull-rods 181 and 182. The lower end of the pull-rod 181 is provided with a handle and a plate or placard having printed thereon the words "Fast Hoist," while to the lower end of the pull-rod 182 is attached a handle and a similar plate or placard, having the words "Slow Hoist" printed thereon. By pulling down upon the pull-rod 181 the clutch X is operated by the intervening mechanism hereinbefore described, thereby locking the pinion 64 to revolve with its shaft, and imparting a fast motion to the chain-drum. By pulling down upon the pull-rod 182 clutch Z is locked to the shaft 61 through the intervening gearing and devices hereinbefore described, thereby transmitting motion to the chain-drum though the intermediate shaft, 71, thereby imparting a slow speed to the drum.

As it is sometimes desirable to lower loads of medium weight at a much higher rate of speed than could be attained by the employment of the gearing, I have provided a brake mechanism whereby the descent of the load may be regulated and governed by friction applied to a brake-wheel. The construction and arrangement of parts to effect this object are as follows: To the bevel wheel 53 of the double clutch on the shaft 18 is secured a brake-wheel, 76, which also serves as a friction base-plate for the clutch, as is clearly shown in enlarged views in Figs. 22 and 23. Encircling the periphery of the brake-wheel 76 is a thin wrought-iron flexible band, having wooden blocks 78, secured thereto by screws passing from the outside through the metal band into said blocks. Brake-band 77 is retained in position by the wrought-metal bands or keepers 79. The opposite ends of the brake-band 77 are attached to the arms of a bell-crank or rocker, 80, attached to the shaft 183, to which is also secured the arm 184. Connecting-rod 185 is pivoted at one end to the arm 184, while its opposite end is pivoted to the arm $O^4$, that is sleeved upon the square rod $L^4$. To the end of the square rod $L^4$ is secured an arm, 186, to which is pivoted a connecting-rod, 187, the opposite end of which is pivoted to an arm, 188, secured to the rock-shaft 189, which is provided with a lateral arm, having pivoted thereto the upper end of the pull-rod 190, the lower end of which is pivoted to a treadle, 191, supported by the bracket 192, located in the hanging frame R. One end of the treadle is provided with a weight, 193, and the other end with a foot-plate, 194, and ratchet-teeth 195. A pawl, 196, engages the ratchet-teeth 195, and is connected with the lever 197 by means of the rod 198. In operating the brake, the double clutch, through which motion is transmitted to the hoisting-drum, is retained in gear until the operator has placed his foot upon the treadle and applied the brake-band, when the shifting collar or block 82 of the clutch is shifted to the center, thereby placing the chain-drum under the control of the brake alone. Thus the operator by means of the brake mechanism is enabled to lower the weight at any speed desired, and arrest its descent at any point and hold it until it shall have been moved to the desired spot where it is to be deposited.

It is sometimes desirable to use the crane for lifting and transferring weights when the motive power is not in use, and for such contingency I have provided a hand-power attachment, consisting of the shaft 83, supported and adapted to slide lengthwise in bearings secured to the side frame of the trolley or crab. To the squared end of the shaft 83 is removably secured the operating-handle 84, while to the opposite end of the shaft is keyed a pinion, 85, which meshes into a wheel, 86, keyed to one end of the shaft 61, whereby motion may be transmitted to shafts 56 and 18, and the chain-drum W operated in the manner hereinbefore described. Trolley or crab H is provided with a like platform, 87, that rests upon similar brackets projecting from the side frames of the crab. To the platform are secured vertical posts that are connected by gas-pipe of small diameter to serve as a guard around the trolley-platform.

It is evident that changes may be made in the arrangement and construction of parts without departing from the spirit of my invention—as, for instance, the square shafts employed for transmitting motion may be replaced by round shafts provided with groove or feather, and the parts engaging therewith correspondingly modified, and thus insure the combined sliding and rotary motion. Again, the pulleys and clutch mechanism, instead of being attached to the main driving-shaft for changing the speed, may be secured to the engine-shaft, and the belt-pulleys secured to the main driving-shaft. Again, instead of employing endless ropes to operate the clutch for changing the speed of the main driving-shaft, a small rock-shaft might be employed for transmitting the motion from any part of the building to the clutch.

Instead of employing the construction of clutches shown and described, other forms and constructions may be used, although I prefer to use clutches of substantially the construction shown and described.

In view of the fact that my improved clutch is adapted for many other uses than that herein shown and described, I make no broad claim in this application to said clutch, as it constitutes the subject-matter of a separate application filed of even date herewith. Therefore I would have it understood that I do not limit myself to the exact construction shown and described; but, Having fully described my invention, what I claim as new, and desire to secure by Letters Patent, is—

1. The combination, with the main driving-shaft, tumbler-bracket bearings, and draw-bar provided with anti-friction rollers, of the crane bridge or frame provided with a flanged plate adapted to engage said anti-friction rollers and automatically raise and lower said bearings, substantially as and for the purpose set forth.

2. The combination, with the main driving-shaft, and the traveling frame or bridge provided with a hanging platform, of devices, substantially as described, to enable the operator on said platform to change the speed of the driving-shaft at any point throughout the travel of the bridge or frame, substantially as and for the purpose set forth.

3. The combination, with the main driving-shaft, the clutch, and high and low speed pulleys connected with said shaft, of an endless rope supported at the side of the building for operating said clutch, substantially as and for the purpose set forth.

4. The combination, with the traveling frame or bridge of the crane, of devices for automatically stopping said bridge near the opposite ends of the trackway upon which it travels, substantially as and for the purpose set forth.

5. The combination, with the main driving-shaft, bridge F, and square shaft I, of the crab or trolley, square shaft I', track-wheels G', and gearing and clutches, substantially as described, for transmitting motion in either direction to the bridge or frame F, substantially as and for the purpose set forth.

6. The combination, with the shaft 18 of the crab or trolley, of the shaft 101, provided with the double clutch, the shaft I', and intermediate gearing, substantially as and for the purpose set forth.

7. The combination, with the square shaft having cylindrical bearings, of the right-angled bracket-bearings and the blocks or cushions, substantially as and for the purpose described.

8. The combination, with the arms J' J², each provided at its outer end with a half-bearing, J³, of the supporting-bracket J⁵, provided with recesses J⁹, and blocks or cushions J¹⁰, secured within said recesses, substantially as and for the purpose set forth.

9. The combination, with a series of square rods, of a pendulum-supporting bracket, substantially as and for the purpose set forth.

10. The combination, with the bracket N', provided with grooves N², and having a weighted arm, N⁴, cast integral therewith, of the bracket-arm N⁶, secured to the bridge or frame F, substantially as and for the purpose set forth.

11. The combination, with a series of square rods, of a bracket secured to the trolley or crab, and sleeved arms connected with said bracket and square rods, substantially as and for the purpose set forth.

12. The combination, with the double clutch on shaft 101, of the square rod L², the pull-rod and connecting devices, substantially as described, for operating the clutch from the hanging platform, substantially as and for the purpose set forth.

13. The combination, with the square shaft I', sliding bevel-wheel 32, mounted thereon, and bevel-wheels 29 and 31, of the double clutch constructed substantially as described, and mounted on shaft 101, substantially as and for the purpose set forth.

14. The combination, with the shaft I, sliding bevel-wheel 12, and bevel-wheels 14, 16, and 17, of the double clutch constructed substantially as described, and provided with bevel-wheels 36 and 37, and the gearing for transmitting reverse motions to the chain-drum, substantially as and for the purpose set forth.

15. The combination, with the shafts 18, 56, and 61, of the intermediate shaft, 71, the double clutch, substantially as described, and the intervening gearing for transmitting a high or low speed to the chain-drum, substantially as and for the purpose set forth.

16. The combination, with the friction-clutch Z, of pinion 62, gear-wheels 70, shaft 71, gears 72 and 63, pinion 64, and gear-wheel connected with the chain-drum, substantially as and for the purpose set forth.

17. The combination, with the clutch X, of the gear-wheel 63, pinion 64, and gear-wheel 73, connected with the drum, substantially as and for the purpose set forth.

18. The combination, with the clutch for changing the speed of the drum, of the square rod L' and suitable connecting devices for operating said clutch from the hanging platform, substantially as and for the purpose set forth.

19. The combination, with the chain-drum, of a brake, and devices, substantially as described, for operating said brake from the hanging platform, substantially as and for the purpose set forth.

20. The combination, with the track-wheels of the crab or trolley and suitable gearing for revolving the track-wheels to cause the crab or trolley to travel in either direction, of clutch mechanism for shifting said gearing and devices for operating said clutch from the hanging carriage, substantially as and for the purpose set forth.

21. The combination, with the chain-drum W, shaft 61, and suitable gearing, substantially as described, for rotating the chain-drum in either direction, of the hand-power attachment consisting of the shaft 83, pinion 85, and wheel 86, and handle 84, substantially as and for the purpose set forth.

22. The combination, with the bevel-wheel 53, of the brake-wheel provided with a groove, and clutch devices connected therewith, and a brake-band encircling said wheel, substantially as and for the purpose set forth.

23. The combination, with the trolley or crab, of devices for automatically stopping its movements at the opposite ends of its supporting-trackway, substantially as and for the purpose set forth.

24. The combination, with the crab or trolley, the main driving-shaft, shaft I, and suitable gearing for moving the trolley in either direction, of a square shaft connected by suitable devices with a double clutch on the trolley, and angle-irons on the trolley-frame, arranged to engage arms on the ends of said square shaft and stop the trolley, substantially as and for the purpose set forth.

25. The combination, with the square rods for operating the clutches and brake on the trolley or crab, of counter-shafts, connecting-rods, and pull rods, substantially as and for the purpose set forth.

26. The combination, with a double clutch on the trolley or crab for causing the trolley to travel in opposite directions, of a square rod and two pull-rods connected therewith by intervening devices, substantially as and for the purpose set forth.

27. The combination, with the double clutch provided with the brake-wheel, of a brake-band, square rod, pull-rod, and connecting devices for operating the brake, substantially as and for the purpose set forth.

28. The combination, with the cradles G G, of the square rods L L' L² L³ L⁴, supported at their opposite ends in bearings secured to said cradle, substantially as and for the purpose set forth.

29. The combination, with the chain-drum, brake-wheel, and intervening mechanism, of the square rod and brake-treadle, the latter being located on the hanging platform, substantially as and for the purpose set forth.

30. The combination, with the main driving-shaft, a frame or bridge adapted to travel lengthwise of the building, and a trolley or crab supported on said frame or bridge, of suitable gearing, substantially as described, for transmitting motion from the main driving-shaft to the frame or bridge through the gearing on the trolley or crab, substantially as and for the purpose set forth.

31. The combination, with a trolley or crab provided with a chain-drum, of gearing and clutches, substantially as described, to enable the motion of the chain-drum to be reversed and its speed regulated at any desired point in the travel of the trolley, substantially as and for the purpose set forth.

32. The combination, with the crab or trolley, of a series of rods for transmitting motion to different parts of the trolley at any point throughout its travel, substantially as and for the purpose set forth.

33. The combination, with the crab or trolley and the square rods I I', of the sliding bevel-wheels, the vertical and cross shafts, and gearing and clutches for transmitting motion from one shaft to the other at any point in the travel of the trolley, substantially as and for the purpose set forth.

In testimony whereof I have signed this specification in the presence of two subscribing witnesses.

THOMAS R. MORGAN, SR.

Witnesses:
EBENEZER A. W. JEFFERIES,
SAM. S. WEBB.